United States Patent [19]

King

[11] 4,181,591

[45] Jan. 1, 1980

[54] ELECTROSTATIC AND ELECTROLYTIC CLARIFIER APPARATUS

[76] Inventor: Arthur S. King, 8021 Cherokee La., Leawood, Kans. 66206

[21] Appl. No.: 826,812

[22] Filed: Aug. 22, 1977

Related U.S. Application Data

[60] Division of Ser. No. 784,559, Apr. 4, 1977, Pat. No. 4,116,789, which is a continuation-in-part of Ser. No. 713,251, Aug. 10, 1976, Pat. No. 4,045,326.

[51] Int. Cl.² .................. C25B 11/02; B03C 5/02; B03D 3/06; B03C 3/04
[52] U.S. Cl. .................. 204/275; 55/145; 55/155; 204/307; 204/277; 209/5; 209/137; 209/157
[58] Field of Search .................. 209/155–157, 209/127 R, 131, 168, 5, 137; 204/275, 302, 307; 55/138, 145, 150, 154

[56] References Cited

U.S. PATENT DOCUMENTS

| | | | |
|---|---|---|---|
| 1,240,824 | 9/1917 | Clawson | 209/169 X |
| 2,563,297 | 8/1951 | Wilson | 55/154 X |
| 2,885,026 | 5/1959 | DiVette | 55/138 |
| 3,042,204 | 7/1962 | Eder | 209/157 |
| 3,437,202 | 4/1969 | Kaiser | 209/138 X |
| 3,539,000 | 11/1970 | Vogel | 209/168 X |
| 3,577,336 | 5/1971 | Shirley | 204/302 |
| 3,899,427 | 8/1975 | Connelly et al. | 209/156 X |

FOREIGN PATENT DOCUMENTS

687947  2/1953  United Kingdom .................. 55/145

*Primary Examiner*—John H. Mack
*Assistant Examiner*—D. R. Valentine
*Attorney, Agent, or Firm*—Schmidt, Johnson, Hovey & Williams

[57] ABSTRACT

A fluid, such as air or water, carrying suspended solids is directed between a pair of oppositely charged, corrugated surfaces in order to subject the flow to an undulating action that increases the frequency with which the solid particles impinge against one another, thereby increasing the rate of flocculation of the solids. In the case of airborne particles, the corrugated surfaces are arranged in an upright condition so that the flocculated particles attracted to one or the other of such surfaces gravitate therefrom into a conveying mechanism that delivers such particles to a collecting receptacle. In the case of liquid-borne particles, the flow is forced to travel upwardly against the force of gravity after passing between the surfaces, thereby encouraging the flocculated particles to settle out into a sump that is associated with the uphill flow passage. In each case, two sets of charged surfaces may be utilized, the first having at least one of its surfaces insulated from the flow for electrostatic action only, while the second has neither surfaces so insulated for electrolytic action.

9 Claims, 7 Drawing Figures

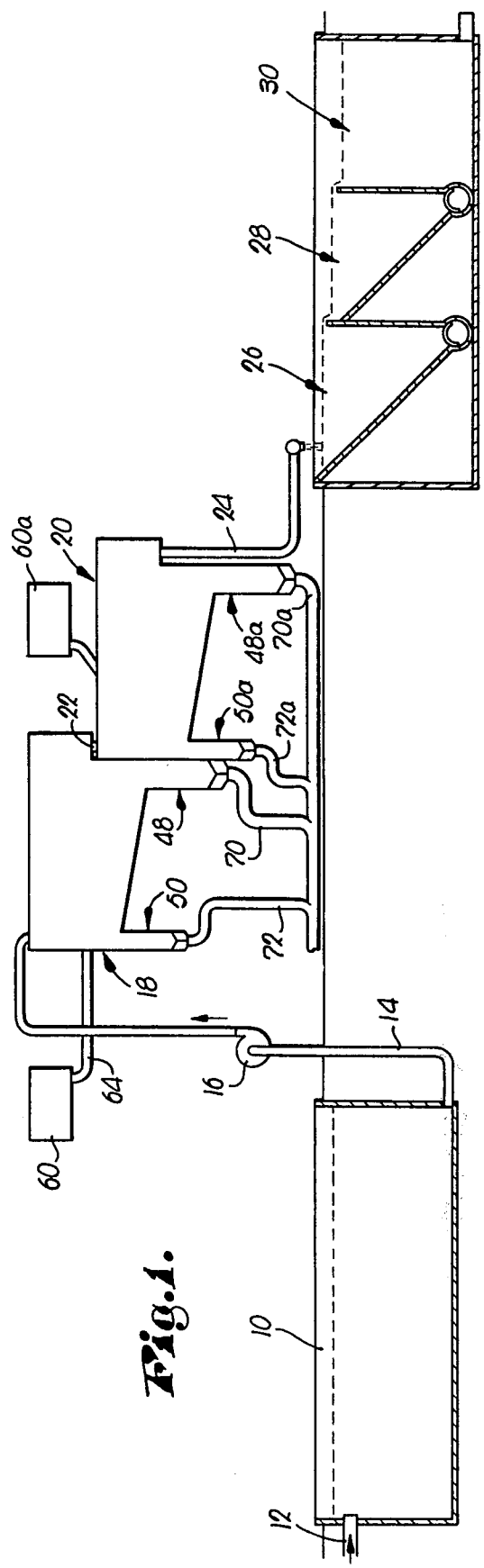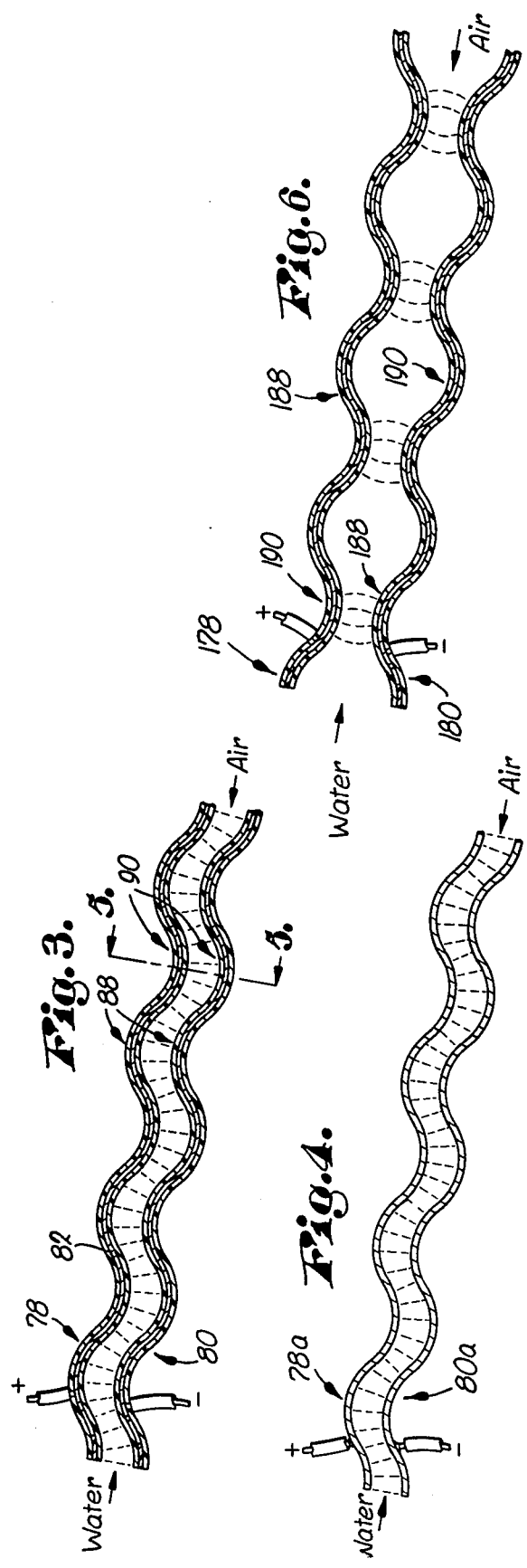

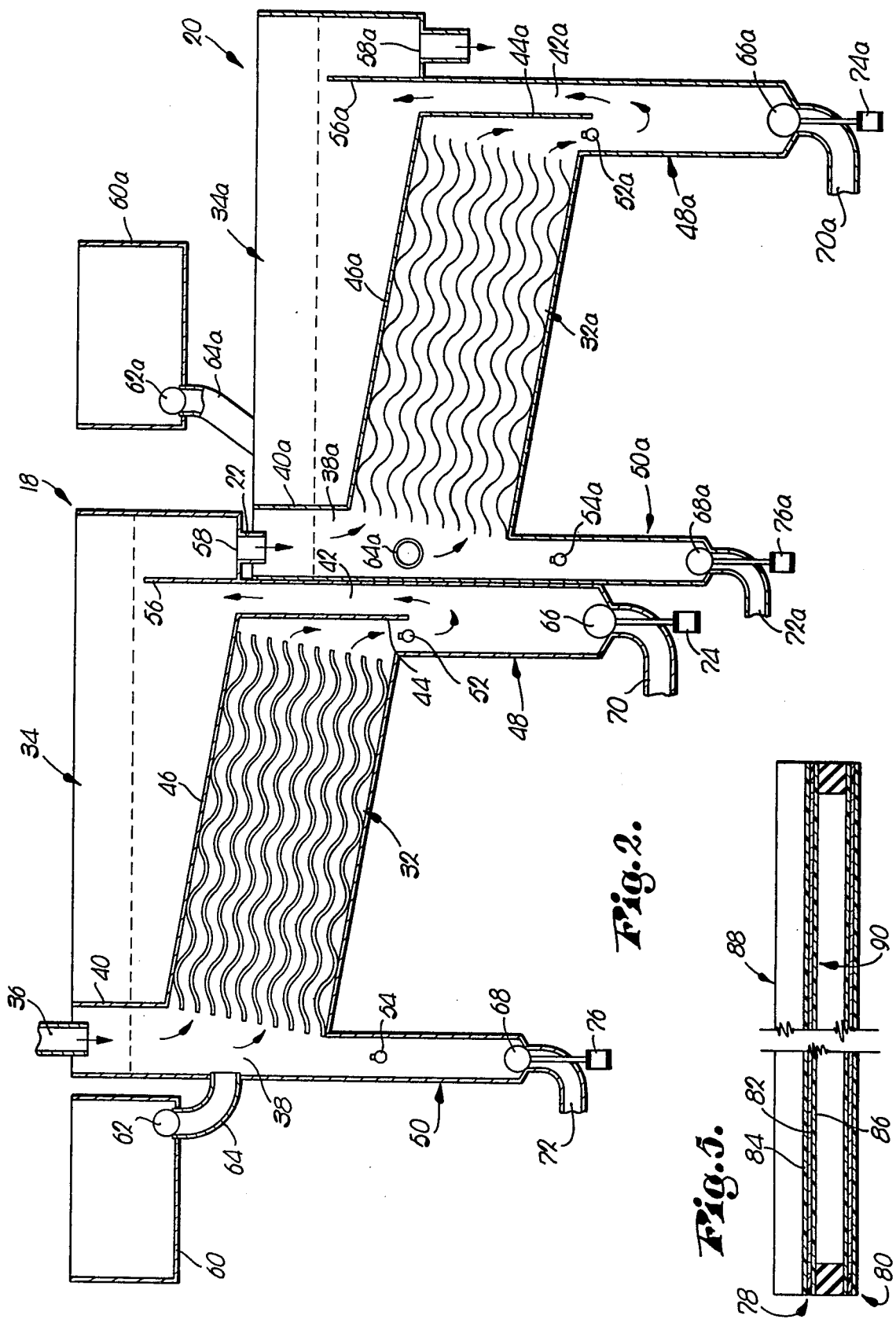

ELECTROSTATIC AND ELECTROLYTIC CLARIFIER APPARATUS

This is a division of application Ser. No. 784,559, filed on Apr. 4, 1977 now U.S. Pat. No. 4,116,789, (which is a C.I.P. of Ser. No. 713,251, Filed: Aug. 10, 1976), now U.S. Pat. No. 4,045,326.

This invention relates to a continuation in many respects of the principles set forth in my co-pending application, Ser. No. 713,251, filed Aug. 10, 1976, and titled "Suspended Solids Extraction System and Method," and in other respects relates to alternatives to such teachings.

While, as before, the best flocculation of suspended solids in a liquid or other fluid seems to result when the fluid is subjected first to an electrostatic treater, and secondly to an electrolytic treater, even when taken individually, the action obtained with each of said treaters may in many instances be improved when the electrodes thereof are corrugated rather severely so that the flow, when forced to travel through the undulating pathway defined by such corrugated surfaces, is undulated to such an extent that the suspended solids impinge against each other with greater frequency, thereby increasing the rate of flocculation. Moreover, I have developed a composite unit that combines both an electric treater and a clarifier in a single unit so that the effluent leaving such unit contains a lower concentration of suspended solids than heretofore possible, thereby requiring less settling time in open basins and the like downstream from such treaters.

Accordingly, one important object of the present invention is to continue many of the important principles of my prior invention as set forth in the aforesaid co-pending application, but at the same time to expand upon and in many instances provide alternative for such principles.

Another important object of the present invention is to provide a way of increasing the frequency of collisions or impingement of solid particles with one another during passage through a treating unit, electric or otherwise, such as to thereby increase the likelihood of forming floc from the suspended solids of sufficient size that it can be readily settled out.

An additional important object of this invention is to embody means for achieving the foregoing object in structures that are designed primarily for liquid flow and structures designed primarily for gaseous flow.

Another important object of the invention is to provide a treating unit of composite design that combines both electric treating sections and clarifier or settling sections in a single unit, thereby providing for a lower level of solid particulate matter in the effluent leaving the treater than has heretofore been possible.

In the drawings:

FIG. 1 is a schematic view of a system employing the principles of the present invention;

FIG. 3 is an enlarged, fragmentary, vertical cross-sectional view of a pair of corrugated treating surfaces in the electrostatic treating unit of the system;

FIG. 4 is a view similar to FIG. 3 of corrugated surfaces in the electrolytic treating unit of the system;

FIG. 5 is an enlarged, cross-sectional view of the corrugated surfaces of the electrostatic unit taken along line 5—5 of FIG. 3;

FIG. 6 is an enlarged, vertical cross-sectional view of an alternative arrangement for the corrugated surfaces suitable for either electrostatic or electrolytic use but illustrating by way of example the electrostatic usage; and FIG. 7 is a perspective view of a treater intended primarily for use in removing airborne solids.

Figure 2:
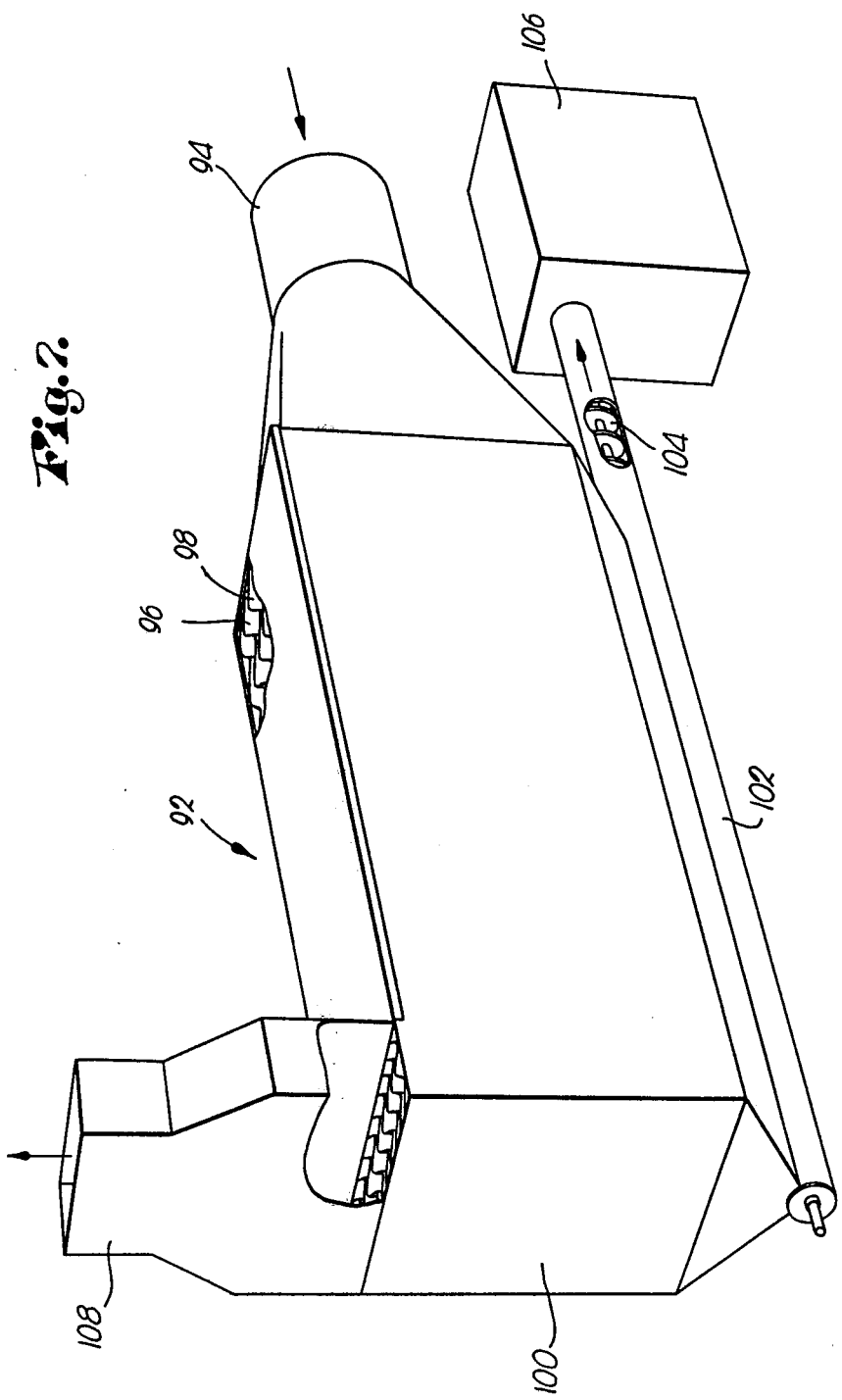
FIG. 2 is an enlarged, fragmentary, vertical cross-sectional view of two major treating components of the system in FIG. 1.

The reservoir 10 receives a body of liquid to be treated through an inlet 12 and discharges the liquid through an outlet 14, assisted in this operation by a pump 16. The pump in turn delivers the liquid into an electrostatic treater 18, from whence it is delivered to an electrolytic treater 20 via a short conduit 22. The effluent ultimately leaving the electrolytic treater 20 through discharge line 24 may then be directed into a series of settling basins 26, 28 and 30 if so desired, the nature and operation of such basins 26-30 being fully set forth in my co-pending application above referred to.

The two treaters 18 and 20 are of virtually identical construction, the only exception being in the nature of their specific electrode constructions, and therefore the following description will be directed toward the treater 18 only, with the understanding that the same principles apply to the treater 20 and the latter's components will be designated by the same numeral as those of the treater 18 with the addition of the letter designation "a."

Treater 18 has a pair of vertically stacked tanks 32 and 34, the lower tank 32 being adapted to encourage flocculation of solids that are suspended in the treated fluid and the upper tank 34 being adapted to promote settling out of such flocculated solids and, thus, clarification of the liquid. An inlet 36 is coupled in flow communication with the lower tank 32 via entryway 38, while such inlet 36 is isolated from the upper tank 34 by means of a transverse partition 40. The lower tank 32 is inclined downwardly away from the entryway 38 and inlet 36 so that there is an inherent tendency for the liquid entering the tank 32 to flow from left to right through the latter (viewing FIG. 2) toward a connecting passage 42 that joins the lower tank 32 with the upper tank 34. Passage 42 is essentially vertically disposed and is defined partially by a baffle 44 disposed across the downstream end of the tank 32 such as to force the liquid leaving the latter to abruptly change directions in order to enter the passage 42. An inclined top wall 46 of the tank 32 serves also as the inclined floor of the upper tank 44.

A sump 48 is located at the downstream end of the tank 32 in association with the passage 42 and the baffle 44 for the purpose of collecting flocculated particles that are unable to overcome the force of gravity and travel upwardly with the liquid flow into the upper tank 34. If desired, although entirely optional, a second sump 50 may be provided at the upstream end of the tank 32, although it is contemplated that such sump 50 will not normally be required or of significant value in conjunction with the first treater 18, its usage becoming more beneficial in connection with the second treater 20 wherein particles will already have been subjected once to an electric action by the time the sump is encountered. A nozzle 52 or the like situated immediately adjacent the downstream end of the tank 32 at the upper end of the sump 48 may be used to inject air or other gaseous bubbles into the flow for the purpose of agitating the liquid within the tank 32. Moreover, as will become apparent below, as a result of the electric field established within the tank 32, the bubbles from nozzle 52 will become charged, providing an attractive "particle" against which the solid particles may become attached, thereby augmenting the flocculating action. An additional nozzle 54 below the upstream end of the tank 32 and at the head of the sump 50 may also be employed.

The upper tank 34 is in the nature of a clarifying or settling basin, and as such has a weir 56 rising above the floor 46 adjacent the outlet conduit 22 for the purpose of maintaining a predetermined liquid level within the tank 34. Once the fluid reaches the top of the weir 56, it can flow over the latter into the outlet 58 that evolves into the conduit 22.

The treater 18 may be flushed periodically to remove accumulated sludge by virtue of a flush tank 60, holding a supply of flushing liquid, that is controlled by a suitable valve 62 associated with a flush line 64 that communicates with the entryway 38 at the upstream end of the tank 32. Valves 66 and 68 control discharge lines 70 and 72, respectively, from the sumps 48 and 50, such valves 66 and 68 being opened by their respective actuators 74 and 76 at such times to provide escape outlets for the accumulated sludge and flushing medium.

As illustrated schematically in FIG. 2, but in more detail in FIGS. 3 and 5, the tank 32 houses electric field generating structure in the nature of vertically spaced layers of electrodes. As illustrated in FIG. 3, each adjacent pair of electrodes 78 and 80 are connected to opposite sides of a source of direct electrical potential for the purpose of generating an electric field therebetween. At least one of such electrodes 78, 80 is insulated from the liquid that flows therebetween, in this instance both electrodes 78 and 80 being fully insulated. One expeditious way of accomplishing such arrangement has been found by sandwiching a layer of conductive metal foil 82 between two dielectric layers 84 and 86 as illustrated with respect to the positively charged electrode 78. As a result of such insulation, there is no current flow across the space between the electrodes 78, 80.

Each of the electrodes 78, 80 is corrugated transversely of the direction of fluid flow therethrough so as to present a pair of opposed, corrugated surfaces between which the liquid must flow in order to reach the downstream end of the tank 32. In FIG. 3 the ridges 88 of the adjacent electrodes 78, 80 are aligned, as are their valleys 90, such that the flow path is of generally uniform width, although serpentine, from the upstream end to the downstream end of the tank 32.

In FIG. 6, however, showing an alternative electrode arrangement, it will be seen that the ridges 188 of one electrode are aligned with the valleys 190 of the other electrode, thereby producing alternating zones of expansion and contraction to which the flowing liquid is successively subjected during its movement through the tank 32. Note further in this latter arrangement that the lines of force between the opposed electrodes 178 and 180 are concentrated at the points where the path is the narrowest as contrasted to the arrangement in FIG. 3 where the lines of force are substantially evenly dispersed throughout. In either arrangement, it is to be noted that the longitudinal axes of the corrugations, defined by the ridges 88, 188 and the valleys 90, 190, as the case may be, extend transversely of the flow path of the fluid.

The tank 32a of the electrolytic treater 20 differs from the tank 32 of the electrostatic treater 18 only with respect to the nature of its electrodes. In the tank 32a, the electrodes 78a and 80a have no dieletric layers and are, thus, not electrically insulated from the flowing liquid. Consequently, electrolytic action occurs.

Operation of the Embodiments in FIGS. 1-6

When the liquid containing suspended solids enters the treater 18 through the inlet 36, it is prevented from entering the top tank 34 by the partition 40 and is directed instead through the entryway 38 at the head of the tank 32. As it flows from left to right viewing FIG. 2 through the tank 32, it is undulated rather dramatically by the transversely corrugated surfaces presented by the electrodes 78, 80. Thus, in addition to the effect of the electric field on the liquid tending to flocculate the suspended solids, the undulating movement imparted to the liquid causes an increased rate of collision or impingement between the solid particles, thereby augmenting the work of the electric field. Further augmenting this action is the presence of numerous gas bubbles from the nozzles 52 and 54 which become charged by the presence of the electric field in the tank 32 to not only agitate the liquid further, but to also provide adhering surfaces for the particles.

Consequently, by the time the liquid reaches the downstream end of the tank 32, a sufficiently large amount of flocculation has occurred so that some of the floc can be settled out. This is encouraged by the presence of the baffle 44 and the upright nature of the connecting passage 42 to the upper tank 34, this arrangement forcing the liquid to abruptly change directions and move upwardly against the force of gravity such that flocculated particles will tend to settle down into the sump 48.

Those particles which have not flocculated sufficiently to drop out of the liquid during its upward movement through passage 42 are carried upwardly into the tank 34 where additional settling can occur. As a result of the weir 56, the level within the tank 34 must reach a preselected height before fluid can depart through the outlet 58. Consequently, the liquid pools behind the weir 56 to promote settling out of the solids, which in turn have a tendency to slide down the inclined floor 56 and drop through the passage 42 into the sump 48.

Normally, the desired amount of separation of the suspended solids from the liquid carrier cannot be obtained with the treater 18 alone, and thus the effluent from the treater 18 is directed through the conduit 22 into the electrolytic treater 20 for a second treatment. The undulating action imposed upon the liquid by virtue of the corrugations within the tank 32a is the same as that obtained within the electrostatic tank 32, but in tank 32a the liquid is exposed to a more powerful electric action in the nature of electrolysis. The flocculated particles leaving the tank 32a must once again overcome gravity to travel through the passage 42a into the clarifying upper tank 34a such that, at this point, the floc tends to settle into the sump 48a. Upon reaching the tank 34a, further settling and clarification occurs as a result of the weir 56a causing the liquid to pool sufficiently to induce the flocculated particles to settle onto the floor 46a and subsequently slide down the latter into the sump 48a.

From the electrolytic treater 20, the clarified liquid may travel through the discharge line 24 into the final clarifying tanks 26, 28 and 30, if desired, although it has been found in many instances that such additional clarification by the tanks 26-30 is not required. Sludge that accumulates within the sumps 48 and 48a, as well as any that may have accumulated in the sumps 50 and 50a, may be periodically flushed by opening the valves 62, 62a; 66, 66a; and 68, 68a. Normally, it is contemplated that the valves 68, 68a will remain closed until after the tanks 32, 32a have been flushed with the valves 66, 66a open, thereby assuring that the flushing medium does, in fact, flow properly through the tanks 32, 32a.

When the electrodes 78, 80 and 78a, and 80a are arranged in the manner illustrated in FIGS. 3 and 4, the flowing liquid is not exposed to as aggressive an action as that obtained with the electrode arrangement illustrated in FIG. 6. In the latter arrangement, the alternating squeezing and releasing action has in some instances been found to be too violent; and in such instances, the gentler arrangement of FIGS. 3 and 4 is to be preferred. Each case must be decided on its own merits, considering the nature of the influent and the resistance to flocculation of the solids suspended therein.

Dust Collector of FIG. 7

The collector 92 operates in many respects like the treating arrangement of FIGS. 1-6 because gaseous-borne solids entering the inlet 94 are subjected to transversely corrugated surfaces presented by the pack of alternately charged electrodes, two of which are indicated by the numerals 96 and 98, respectively. Preferably, the electrodes 96 and 98 are of the insulated "sandwich" construction illustrated in FIG. 3 so that no electrical current flows therebetween. The undulating action imparted to the gas flow causes an increased frequency of collision of the solid particles, and the charged nature of the electrodes 96, 98 provides attractive surfaces for the particles which may themselves be oppositely charged.

The electrodes 96, 98 are vertically disposed within the housing 100 such that particles collecting thereon will inherently gravitate into the conveyor mechanism 102 (illustrated in the nature of an auger 104), whereupon they can be drawn off into the collecting receptacle 106. The gas itself may be exhausted from the collector 92 through the stack 108 situated at the end of the housing 100 remote from the inlet 94.

In the case of the liquid treating system illustrated in FIGS. 1-6, such an arrangement has been found to be particularly, although not exclusively, useful in connection with a dairy processing facility wherein it is necessary to remove such suspended solids as whole milk, cream, butterfat, yogurt and even some fecal materials. The collector of FIG. 7 has been found to be extremely helpful in connection with dryers that are used to remove the moisture from sludge obtained by using the system of FIGS. 1-6, the dryers by virtue of a strong airflow tending to entrain minute solid particles from the sludge and discharge the same into the atmosphere unabated when the collector 92 is not used.

Having thus described the invention, what is claimed as new and desired to be secured by Letters Patent is:

1. Apparatus for use in removing suspended solids from a fluid comprising:
   means defining a pair of opposed, oppositely electrically charged, corrugated surfaces facing one another;
   means for directing the fluid along a predetermined flow path between said surfaces,
   said surfaces having the longitudinal axes of their corrugations extending transversely of said flow path to cause undulation of the fluid as it flows across the corrugations and therefore encourage solid particles to impinge against one another and join together in larger masses,
   the corrugations on each surface presenting alternating peaks and valleys, the inwardly extending peaks of the surfaces being aligned with one another so as to present alternating zones of constriction and expansion along said flow path; and
   an additional pair of opposed, corrugated surfaces downstream from said first-mentioned pair, said additional pair having the longitudinal axes of their corrugations arranged transversely of the flow path therebetween, said surfaces of each pair being oppositely charged electrically with at least one surface of said first-mentioned pair being electrically insulated from the fluid and neither of the surfaces of said additional pair being electrically insulated from the fluid.

2. Apparatus as claimed in claim 1, wherein said surfaces are disposed to incline said flow path downwardly in the direction of flow.

3. Apparatus for use in removing suspended solids from a fluid comprising:
   means defining a pair of opposed, oppositely electrically charged, corrugated surfaces facing one another;
   means for directing the fluid along a predetermined flow path between said surfaces,
   said surfaces having the longitudinal axes of their corrugations extending transversely of said flow path to cause undulation of the fluid as it flows across the corrugations and therefore encourage solid particles to impinge against one another and join together in larger masses,
   the corrugations on each surface presenting alternating peaks and valleys, the inwardly extending peaks of the surfaces being aligned with one another so as to present alternating zones of constriction and expansion along said flow path,
   said surfaces being substantially upright and said flow path being substantially horizontal;
   means for exhausting the fluid from the surfaces; and
   means below said surfaces for receiving and collecting solids that have gravitated from said surfaces.

4. A clarifying unit for use in removing suspended solids from a liquid comprising:
   a pair of stacked chambers,
   the lower chamber of said pair being operable to encourage flocculation of suspended solids and the upper chamber of said pair being operable to encourage settling out of the solids flocculated by the lower chamber,
   said lower chamber including a set of superimposed, vertically spaced apart electrode layers inclined generally downwardly and forwardly with respect to the direction of flow therethrough;
   a fluid inlet connected with the lower chamber;
   a fluid outlet connected with the upper chamber;
   a connecting passage between said chambers at a downstream end of the lower chamber,
   said passage being disposed to require flow against the force of gravity in order to reach said upper chamber from the lower chamber, thereby tending to settle out flocculated solids before they reach the upper chamber; and
   a sump associated with said passage for collecting floc, said upper chamber having a floor sloping toward said sump, said floor of the upper chamber comprising a top wall of the lower chamber.

5. A clarifying unit as claimed in claim 4; and a baffle associated with said passage in position to require the liquid to abruptly change directions upon issuing from the lower chamber and in order to enter the upper chamber.

6. A clarifying unit as claimed in claim 4, wherein said lower chamber is inclined downwardly toward said sump from said inlet.

7. A clarifying unit as claimed in claim 4; and means for periodically flushing the lower chamber and said sump to remove accumulated sludge.

8. A clarifying unit as claimed in claim 4, wherein said upper chamber is provided with a weir restricting flow to said fluid outlet and maintaining a predetermined liquid level in the upper chamber.

9. A clarifying unit as claimed in claim 4; and means for introducing bubbles into said lower chamber for boosting the flocculating action.

* * * * *